Sept. 2, 1952  G. HAYES  2,608,882
DRIVING GEAR FOR ROUTE OR DESTINATION INDICATORS
Filed Aug. 28, 1950
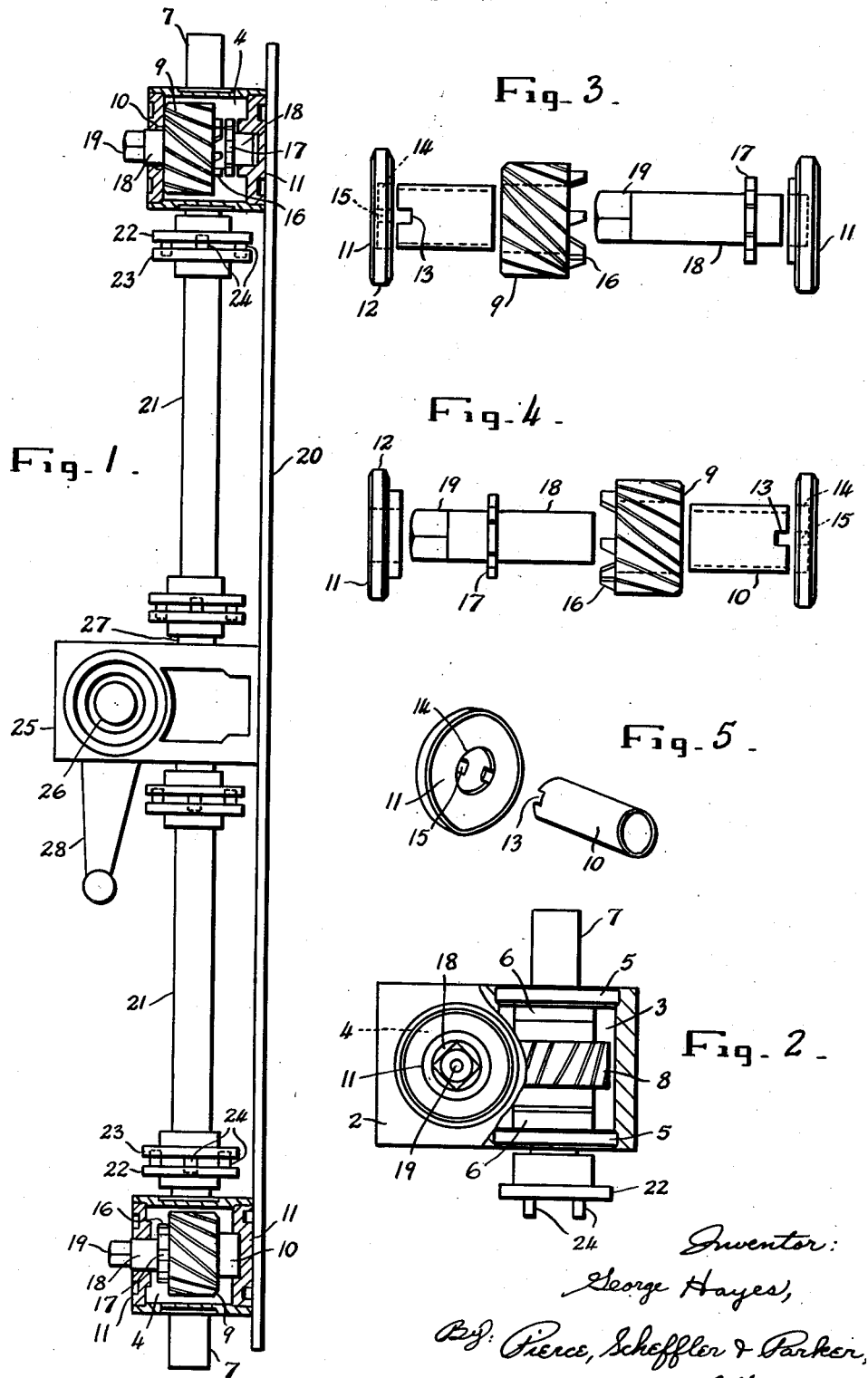
Inventor:
George Hayes,
By: Pierce, Scheffler & Parker,
Attorneys.

Patented Sept. 2, 1952

2,608,882

UNITED STATES PATENT OFFICE 2,608,882

DRIVING GEAR FOR ROUTE OR DESTINATION INDICATORS

George Hayes, Moortown, Leeds, England, assignor to G. H. Patents Limited, Leeds, England, a British company, and The Equipment and Engineering Co., Limited, London, England, a British company Application August 28, 1950, Serial No. 181,815
In Great Britain September 29, 1949

7 Claims. (Cl. 74—665)

This invention relates to the driving gears of route or destination indicators of the type in which at least one pair of winding rollers, carrying a blind between them, are adapted to be driven each in one direction only through the medium of helical gears from a common driving shaft.

Various types of driving gears of the above type have been constructed and the natural end thrust of the helical gearing has been utilised to selectively operate the winding rollers according to the direction of rotation imparted to the common driving shaft. Moreover, it has been known to mount each driven pinion on a bearer sleeve through which the short roller driving shaft is passed so that the pinion floats axially on the sleeve for the engagement and disengagement of its clutch members with complementary clutch members carried by the said shaft. It is usual to fix the sleeve in a stationary position and it is known to provide a driving shaft with an extension which passes through the bearer sleeve and is secured thereto.

According to the present invention, there is provided a route or destination indicator driving gear of the kind specified, characterised in that the pinion bearer sleeve has interlocking engagement with its gear housing or other carrier part, to be held against rotation in its required position. Interlocking engagement may be provided by one or more complementary projections and recesses and the sleeve end may be held within a recess. The sleeve receiving recess may be within the housing body or a separate bearing which forms part of the housing.

Referring now to the accompanying drawing in which an embodiment of the invention is shown:

Fig. 1 is a part sectional front elevation of the assembled roller driving gears;

Fig. 2 is a part sectional side elevation of one driving gear unit;

Figs. 3 and 4 are respectively an enlarged front elevation of the upper and lower roller driving gears ready for assembly; and Fig. 5 is a perspective view of a pinion bearer sleeve and bearer plate before assembly.

In the embodiment of this invention shown, an indicator driving gear unit is constructed in the form of a diecast or other housing 2 with a hole 3 transversely therethrough and a second hole 4 (or recess) therein at right angles to the hole 3. Said hole 3 is recessed at each end to receive the flange 5 of a bearing 6 through which a short operating shaft 7 passes with a helical driving gear pinion 8 on the shaft lying between the two bearings which hold it against axial movement. This hole opens out into the hole 4 so that the said driving gear pinion 8 can mesh with a driven gear pinion 9, located on a bearer sleeve 10. The latter is held in a stationary position by being interlocked with one of the removable bearings 11, each having a flange 12 fitted into a recess in the aforesaid manner for the other two bearings 6. The driving gear, for a route or destination indicator, requires two of these gear units which are almost identical with the exception of the mounting of this driven pinion 9. In the one instance, the upper bearer sleeve 10 is interlocked with the inner (left hand) bearing 11 in the housing, and in the other instance the lower sleeve is interlocked with the outer (right hand) removable bearing 11. Each sleeve 10 has two notches or keyways 13 in one end (there may be only one, or more than two) and the sleeve fits into a recess 14 of its associated bearing 11 to interlock with complementary radial projections 15 in the recess. In either case, the sleeve can readily be slipped into position and held in the required stationary position during assembly and, when desired, can be removed readily from its stationary position if the unit is dismantled. Each driven pinion has clutch teeth 16 on one end face and these are adapted to mesh with complementary teeth 17 on a short roller driving shaft 18 which passes through the bearer sleeve 10, the end 19 of the roller driving shaft passes out through the inner removable bearing 11 and is of square or other construction for driving connection with a blind roller. In both cases, the inner end of the roller driving shaft may enter the recess in the right hand bearing 11 of the housing but, in one case, the lower shaft is surrounded by the sleeve 10 fitted into such bearing but, in the other instance, the end of the shaft itself passes into its bearing 11 in the end wall of the housing. In both instances the sleeve will form a long bearing. In the upper construction, the clutch teeth on the shaft are at the outer end of the sleeve and bear against it and the outer bearing 11, and in the lower construction, the shaft clutch teeth are at the inner end of the sleeve which bears against such teeth and against the inner bearing 11 in the housing wall. With this arrangement the shaft 18, bearer sleeve 10 and pinion 9 can readily be assembled within the housing, or before location therein, together with the end bearings which will complete the housing and enclose the gear. The various separate bearings 6 and 11 may all be pressed into position and secured by crimping the edges of the recesses in the housing. If this is adopted, then the edges of the flanges of the bearings are chamfered off slightly as shown to facilitate the crimping action.

Instead of a hole 4 being formed in the housing 2 with two separate bearings, a recess may be formed and closed by one bearing. In this instance the end wall of the recess will serve the same purpose as a removable bearing when fixed.

A pair of units, constructed as above, may be mounted on a fixing plate 20 in alignment and then joined by a connecting shaft 21 slipped in between the two short operating shafts 7. The driving connection between shafts may comprise a close coil spring pressed onto the adjacent ends of the two shafts. Alternatively, the shafts may be connected by adjacent collars 22, 23 (their adjacent faces may be slightly convex) joined together by pegs 24 entered into holes, or equivalent connecting means. If the rotative driving force is to be applied in line with the operating shafts 7, one of the latter may be extended by means of a driving shaft linked thereto through a sleeve or other connection. Alternatively, as shown, a further gear unit 25 is interposed between the two aforesaid gear units with a driving shaft 26 leading therefrom. The short shaft 27 of this third gear unit is connected up to the connecting shaft 21 (made in two parts) or to the connecting shaft and a gear unit shaft 7. Rotation may be achieved by a handle 28 or other means. With this construction, gear units in housings may be constructed as standard parts and several units connected together on a fixing plate or otherwise mounted in position with a connecting shaft or shafts and other attendant parts, as required, in a simple and easy manner. Also, should any gear unit break down, it can readily be replaced by another complete unit at will.

What I claim is:

1. Driving gear for roller blind indicators including enmeshed driving and driven helical gear pinions, a driving shaft which rotates the driving pinion, a roller operating shaft at right angles to the first shaft, carrier means for said shafts, clutch means between the roller operating shaft and the driven pinion, and a bearer sleeve forming a bearing for said roller shaft and a mounting for the driven pinion, said sleeve having interlocking engagement at one end with said carrier means to be held against rotation.

2. Driving gear for roller blind indicators including a gear housing, a driving shaft and a roller operating shaft mounted at right angles to one another in said housing, driving and driven helical gear pinions in constant mesh, clutch means between said roller shaft and the driven pinion to become automatically engaged as the latter pinion is rotated in one direction and disengaged by a reverse rotation, a bearer sleeve carrying the driven pinion and surrounding the roller shaft, and complementary projections and recesses which hold the sleeve at one end detachably but firmly mounted in the gear housing.

3. Driving gear according to claim 2, having the retained end of the bearer sleeve held within a recess formed in the wall of the gear housing.

4. Driving gear according to claim 2, having the retained end of the bearer sleeve held within a recess formed in a separate bearing which forms part of the gear housing.

5. Driving gear according to claim 1, characterized by the bearer sleeve being adapted to be slipped axially into a recess at one end to be held in position temporarily by said recess and against rotation by complementary projections and recesses and be capable of withdrawal when dismantling the gear.

6. Driving gear for roller blind indicators comprising a complete gear unit in a housing with removable bearings, short driving and driven shafts therein, clutch teeth on said driven shaft, a helical gear pinion secured on the driving shaft, a removable bearer sleeve forming a long bearing for the driven shaft and interlocked with one of said bearings, and a helical gear pinion axially slidable on the sleeve and carrying clutch teeth adapted to engage said clutch teeth on the driven shaft; the shafts, pinions and sleeve all being capable of easy mounting and withdrawal.

7. Driving gear including a set of gear units according to claim 6, said driving shafts being connected together by a connecting shaft through separable driving connections.

GEORGE HAYES.

REFERENCES CITED

The following references are of record in the file of this patent:

UNITED STATES PATENTS

| Number | Name | Date |
|---|---|---|
| 1,064,365 | Munsing | June 10, 1913 |
| 1,301,664 | Douglas | Apr. 22, 1919 |
| 1,394,852 | McClure | Oct. 25, 1921 |

FOREIGN PATENTS

| Number | Country | Date |
|---|---|---|
| 228,544 | Switzerland | Nov. 16, 1943 |
| 564,961 | Great Britain | Oct. 20, 1944 |